US006308587B1

(12) United States Patent
Shinkawa et al.

(10) Patent No.: US 6,308,587 B1
(45) Date of Patent: Oct. 30, 2001

(54) ACTUATOR FOR VEHICLE-DOOR LOCKING MECHANISM

(75) Inventors: Masaki Shinkawa, Yamato; Yutaro Tanaka, Tokyo, both of (JP)

(73) Assignee: Harada Industry Co., Ltd., Tokyo (JP)

(*) Notice: Subject to any disclaimer, the term of this patent is extended or adjusted under 35 U.S.C. 154(b) by 0 days.

(21) Appl. No.: 09/448,968

(22) Filed: Nov. 24, 1999

(30) Foreign Application Priority Data

Nov. 27, 1998 (JP) ........................................ 10-337086

(51) Int. Cl.[7] ........................ F16H 27/02; F16H 29/02; F16H 29/20

(52) U.S. Cl. .................... 74/89.25; 74/89.26; 185/40 R; 185/40 B; 185/40 H; 292/201

(58) Field of Search ............................ 74/89.25, 89.26; 185/40 R, 40 B, 40 H, 37, 39; 292/201

(56) References Cited

U.S. PATENT DOCUMENTS 4,821,521 * 4/1989 Schüler ................................ 60/716
4,932,277 * 6/1990 Beaux .
5,035,454 * 7/1991 Fukumoto et al. ................. 292/337
5,983,739 * 11/1999 Feder ................................ 74/89.15

FOREIGN PATENT DOCUMENTS 2 630 773 * 4/1988 (FR) .

* cited by examiner

*Primary Examiner*—David Fenstermacher
(74) *Attorney, Agent, or Firm*—Pennie & Edmonds LLP

(57) ABSTRACT

An actuator for vehicle-door locking mechanism, includes a driving motor, a first deceleration mechanism for decelerating a rotation of the driving motor, a lead screw to which the rotation of the driving motor is transmitted through the first deceleration mechanism, a nut member fitted on the lead screw and moved in an axial direction of the lead screw in accordance with a rotation of the lead screw, an output mechanism for causing a door locking mechanism to perform one of a locking operation and an unlocking operation in association with the movement of the nut member, a second deceleration mechanism for decelerating a rotation of the lead screw, and an automatic bidirectional-returning mechanism to which the rotation of the lead screw is transmitted through the second deceleration mechanism, the automatic bidirectional-returning mechanism including a single home-returning coil spring for automatically returning the nut member to an initial position after the output mechanism performs one of the locking operation and the unlocking operation.

4 Claims, 5 Drawing Sheets

ACTUATOR FOR VEHICLE-DOOR LOCKING MECHANISM

BACKGROUND OF THE INVENTION

The present invention relates to an actuator for use in a vehicle-door locking mechanism, which includes an automatic bidirectional-returning mechanism using a single return coil spring as a home returning spring for allowing a manual operation.

As such an actuator, there is a conventional one shown in FIGS. 5 and 6A to 6C. FIG. 5 is a plan view of the constitution of a major part of the prior art actuator. In this figure, reference numeral 51 denotes a driving motor, 52 shows a small gear such as a helical pinion attached to a shaft of the driving motor, and 53 indicates a large gear such as a helical worm gear engaged with the small gear 52. Furthermore, reference numeral 54 shows a lead screw serving as a main shaft fixed to the large gear 53 so as to penetrate the center thereof and having a screw section 54*a* on the circumference thereof, 55 indicates a nut member fitted on the lead screw 54 and moved along the axis of the screw 54 in accordance with the rotation of the screw 54, and 56 denotes a lever turned on its axis within the range of a given angle in accordance with the movement of the nut member 55. Reference numeral 57 denotes an output shaft provided coaxially with the axis of the lever 56 and numeral 58 indicate s an output arm for transmitting the rotation force of the output shaft 57 to a door locking mechanism (not shown).

An automatic bidirectional-returning mechanism 60 for returning the lead screw 54 to its home position (initial position) is mounted on an elongated end portion of the lead screw 54 which penetrates the large gear 53 toward the right side of FIG. 5.

FIG. 6A is a perspective view of the constitution of the automatic bidirectional-returning mechanism 60. Referring to FIG. 6A, the mechanism 60 includes a bobbin 61 fixed coaxially to the elongated end portion of the lead screw 54. The bobbin 61 includes a cylindrical section (not shown) having a predetermined length and located on its axis, a pair of flanges 61*a* and 61*b* provided on both ends of the cylindrical section so as to be opposed to each other, and a strip-like operation member 61*c* so as to build a bridge between the flanges 61 and 61*b*.

A single home-returning coil spring 62 is wound around the bobbin 61. Both ends of the coil spring 62 are each bent like a letter “L” in the radial direction thereof, and these bent portions serve as engaging end portions 62*a* and 62*b*.

One engaging end portion 62*a* passes near one side of the operation member 61*c* of the bobbin 61 and its tip is brought into contact with one side of a stopper 64 at a given pressure. The other engagement end portion 62*b* passes near the other side of the operation member 61*c* of the bobbin 61 and its tip is brought into contact with the other side of the stopper 64 at a given pressure.

The stopper 64 is formed on a mounting base 63 of an actuator holding case integrally with the base 63 as one unit. The stopper 64 is formed of a rectangular projection in parallel with the axis of the coil spring 62.

The prior art actuator so constituted operates as follows. If the driving motor 51 rotates forward to lock the door of a vehicle, the small gear 52 rotates in the direction of arrow A in FIG. 5 and accordingly the large gear 53 rotates in the direction of arrow B. The nut member 55 thus moves relatively in the direction of arrow C. A projection 55*a* of the nut member 55 is then pressed on the left inner side of a fitting window 56*a* of the lever 56 in FIG. 5. The lever 56 therefore turns in the direction of arrow D1. As the lever 56 turns, the output arm 58 turns around its output axis 57 in the direction of arrow E1. If the output arm 58 turns by a distance corresponding to a stroke S1, the door locking mechanism (not shown) is locked.

When the large gear 53 and lead screw 54 start rotating in the direction of arrow B, the bobbin 61 of the mechanism 60, fixed to the lead screw 54, also starts rotating in the same direction. The operation member 61*c* thus causes the engaging end portion 62*a* of the coil spring 62 to be biased in the direction of arrow F1 in FIG. 6B. Since the other engagement end portion 62*b* of the coil spring 62 is engaged with the other side of the stopper 64, the coil spring 62 is compressed gradually according to the rotation of the operation member 61*c*. As indicated by the broken line in FIG. 6C, when the engaging end portion 62*a* biased by the operation member 61*c* reaches and contacts the other side of the stopper 64, the portion 62*a* cannot rotate any more.

In this state, the power of the driving motor 51 is cut off by means of, e.g., a limit switch and the motor 51 stops rotating accordingly. If the driving motor 51 stops, the decompression force of the compressed coil spring 62 is transmitted to the lead screw 54 through the bobbin 61 and also to the motor 51 through the small and large gears 52 and 53. The motor 51 and lead screw 54 thus rotate backward. The nut member 55 moves in a direction opposite to that of arrow C and returns to its initial position. When the engagement end portion 62*a* of the coil spring 62 returns to one side of the stopper 64, the above decompression force is lost. The nut member 55 is therefore returned to the initial position and stabilized.

The returning operation of the nut member 55 is performed independently within the range of the fitting window 56*a* of the lever 56 such that it does not contact the lever 56. The lever 56 thus remains stationary in which position a door locking operation is performed or in which position the lever 56 is rotated only through an angle θ1.

When the driving motor 51 rotates backward to unlock the vehicle door, the small gear 52, large gear 53 and lead screw 54 rotate in a direction opposite to the above direction, and the nut member 55 moves in a direction opposite to that of arrow C. The lever 56 thus turns in the direction of arrow D2, the output shaft 57 rotates in the same direction, and the output arm 58 turns in the direction of arrow E2. If the output arm 58 turns by a distance corresponding to a stroke S2, the door locking mechanism is unlocked.

The automatic bidirectional-returning mechanism 60 performs an operation opposite to the foregoing operation. More specifically, the engagement end portion 62*b* of the coil spring 62 is biased in the direction of arrow F2 in FIG. 6B such that the portion 62*b* is separated from the other side of the stopper 64 by means of the operation member 61*c* of the bobbin 61. When the engagement end portion 62*b* reaches and contacts one side of the stopper 64, the bias operation stops. In this time, a limit switch (not shown) operates to cut off the power of the driving motor 51 and stop its rotation.

In the prior art door locking actuator having the above constitution, the lead screw 54 can rotate only one rotation or less in either the forward or backward direction. Usually, the lead screw 54 can turn only ±0.88 turn. The operation end of the output arm 58 thus needs shifting by a required stroke S1=S2 (about 15 mm at the tip of the arm) in order to sufficiently operate the door locking mechanism and accordingly the lead angle β of the lead screw 54 has to be considerably large. If the lead angle β is increased, naturally, the driving force of the door locking mechanism is likely to lower to cause a malfunction.

The lead angle β is obtained by the following equation: $\tan\beta = L/2\pi r$, where L represents a lead (the distance by which the screw advances). Incidentally, the lead L of the conventional lead screw is 6.16 mm.

To achieve the above stroke S1=S2, the lead L of the lead screw 54 should be set to 8.1 mm or more. However, this causes the problem that the torque of the lead screw 54 is decreased extremely and a necessary amount of torque cannot be obtained.

To compensate for the inadequacy of torque, it is necessary to increase the axle ratio of a deceleration gear mechanism including the gears 52 and 53 for reducing the rotation speed of the driving motor 51 and transmitting it to the lead screw 54. If the axle ratio is increased, the torque inadequacy can be prevented but the rotation speed becomes low. Consequently, the door locking mechanism becomes difficult to operate at a prescribed rate (0.5 second or lower), thereby causing a drawback that the response speed of the lock or unlock operation of the door locking mechanism is low.

BRIEF SUMMARY OF THE INVENTION

The object of the present invention is to provide an actuator for vehicle-door locking mechanism including an automatic bidirectional-returning mechanism capable of performing a locking or unlocking operation of a door locking mechanism stably, reliably and quickly though its constitution is simple.

To attain the above object, the actuator of the present invention has the following feature in constitution. The other features will be clarified later in the Description of the Invention.

An actuator for vehicle-door locking mechanism according to the present invention, comprises a driving motor, a first deceleration mechanism for decelerating a rotation of the driving motor, a lead screw to which the rotation of the driving motor is transmitted through the first deceleration mechanism, a nut member fitted on the lead screw and moved in an axial direction of the lead screw in accordance with a rotation of the lead screw, an output mechanism for causing a door locking mechanism to perform one of a locking operation and an unlocking operation in association with the movement of the nut member, a second deceleration mechanism for decelerating a rotation of the lead screw, and an automatic bidirectional-returning mechanism to which the rotation of the lead screw is transmitted through the second deceleration mechanism, the automatic bidirectional-returning mechanism including a single home-returning coil spring for automatically returning the nut member to an initial position after the output mechanism performs one of the locking operation and the unlocking operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles f the invention.

DETAILED DESCRIPTION OF THE INVENTION (Embodiment)

[Constitution]

Figure 1:
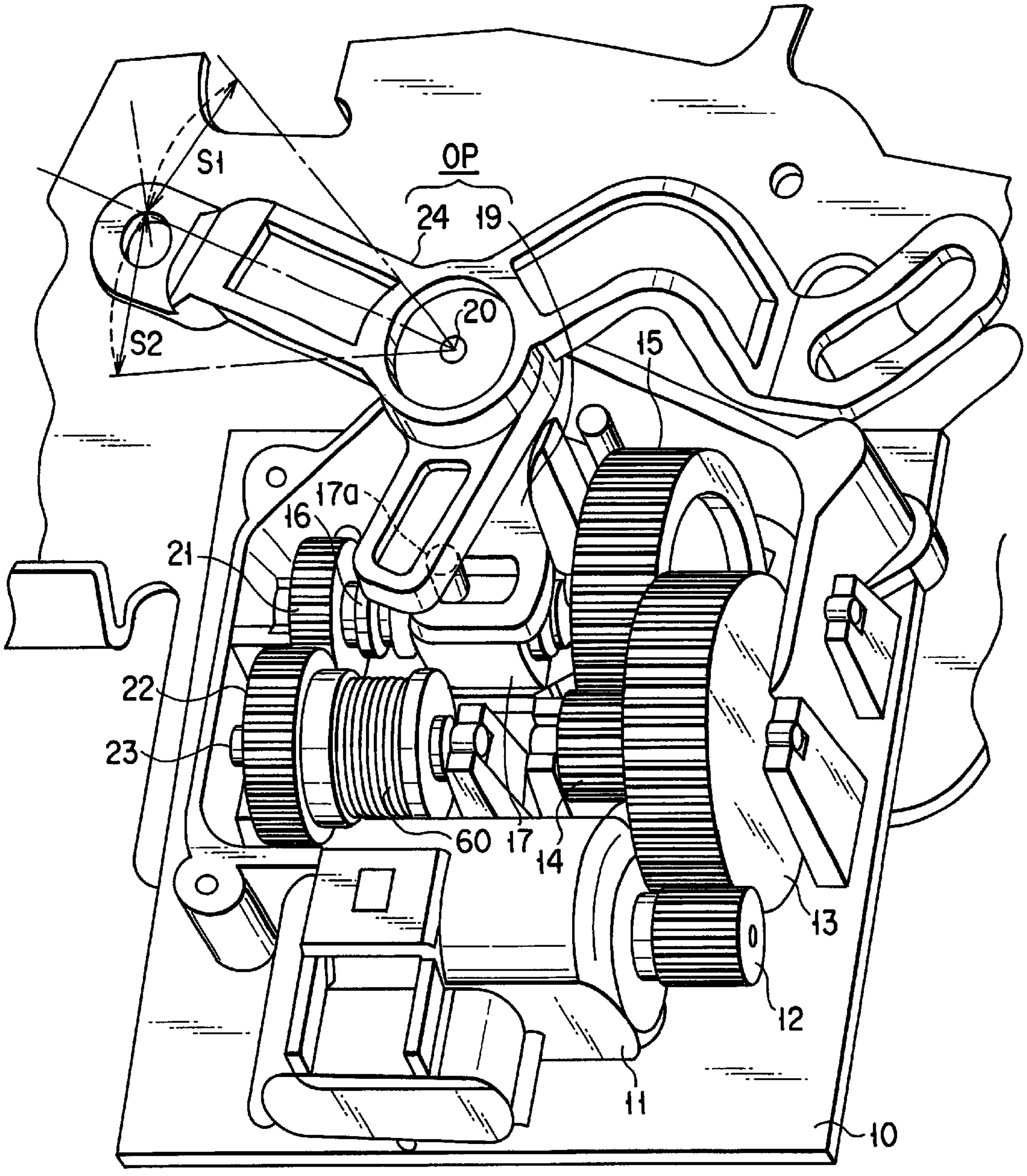
FIG. 1 is a perspective view of the entire constitution of an actuator for vehicle-door locking mechanism according to an embodiment of the present invention.

In FIG. 1, reference numeral 10 denotes a mounting base of an actuator holding case. A driving motor (DC motor) 11 is disposed on the mounting base 10 such that it can rotate forward or backward thereon. A small gear 12 (having, e.g., 9 teeth), such as a helical pinion, is fixed to the rotation axis of the driving motor 11, while a large gear 13 (having, e.g., 36 teeth), such as a helical worm gear, is engaged with the small gear 12. Another small gear 14 (having, e.g., 10 teeth) is fixed to the large gear 13 integrally as one unit and, in other words, the large and small gears 13 and 14 constitute a double gear. Another large gear 15 (having, e.g., 36 teeth) is engaged with the small gear 14 and fitted to one end portion of a lead screw 16 serving as a main shaft. A nut member 17 is fitted on the lead screw 16.

Figure 2:
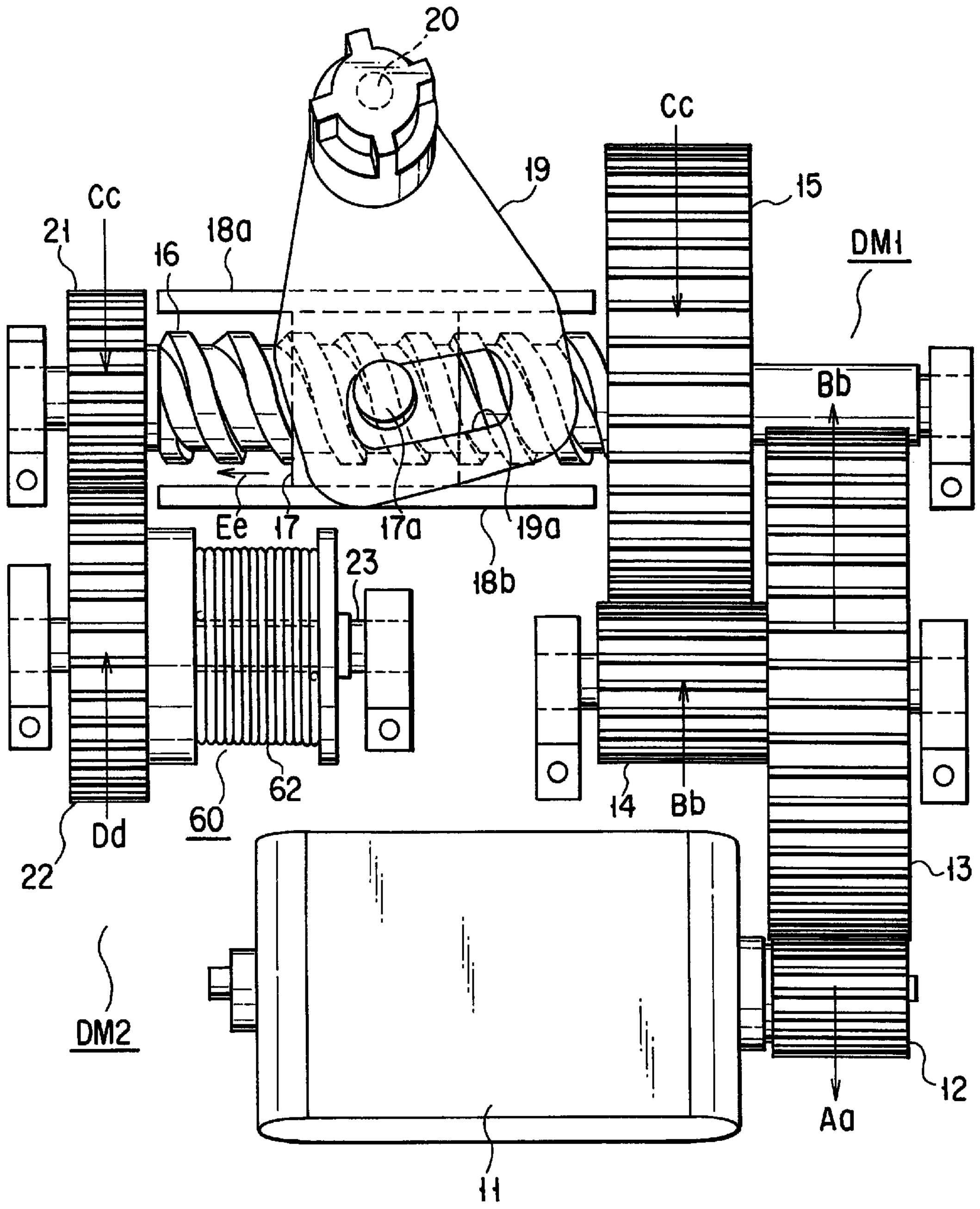
FIG. 2 is a plan view of the main part of the actuator according to the embodiment of the present invention, which is seen from a slightly slanting direction.

Referring to FIG. 2, paired guide rails 18*a* and 18*b* are arranged close to both sides of the lead screw 16, respectively, and the nut member 17 is guided and movably supported by the guide rails 18*a* and 18*b*. If, therefore, the lead screw 16 rotates, the nut member 17 can be guided by the guide rails 18*a* and 18*b* and moved along the axis of the lead screw 16.

The above guide function can be fulfilled without providing the guide rails 18*a* and 18*b*. The nut member 17 can be held in an irrotational state by fitting a projection of the nut member 17 into fitting windows of paired levers 19 which are provided up and down so as to be opposed to each other.

The projection 17*a* is shaped like a short column and formed in the center of the surface of the nut member 17. The projection 17*a* is fitted into the fitting window 19*a* of the lever 19. The lever 19 can be turned around an output shaft 20 within the range of a given angle. The fitting window 19*a* is formed to such a size that the nut member 17 can be moved from the initial position to the locking position or to the unlocking position when the lever 19 turn to the locking or unlocking position.

Returning to FIG. 1, the output shaft 20 is provided along the axis of the lever 19, and an output arm 24 is attached to the output shaft 20. The output arm 24 turns according to the rotation of the lever 19 and, as shown, its tip varies only by a required stroke S1=S2 (about 15 mm) to perform a locking or unlocking operation of a door-locking mechanism (not shown). The lever 19, output shaft 20 and output lever 24 constitute an output mechanism OP for performing the locking operation as the nut member 17 moves by a given distance in one direction from the initial position and for performing the unlocking operation as the nut member 17 moves by a given distance in another direction from the initial position.

Figure 6A:
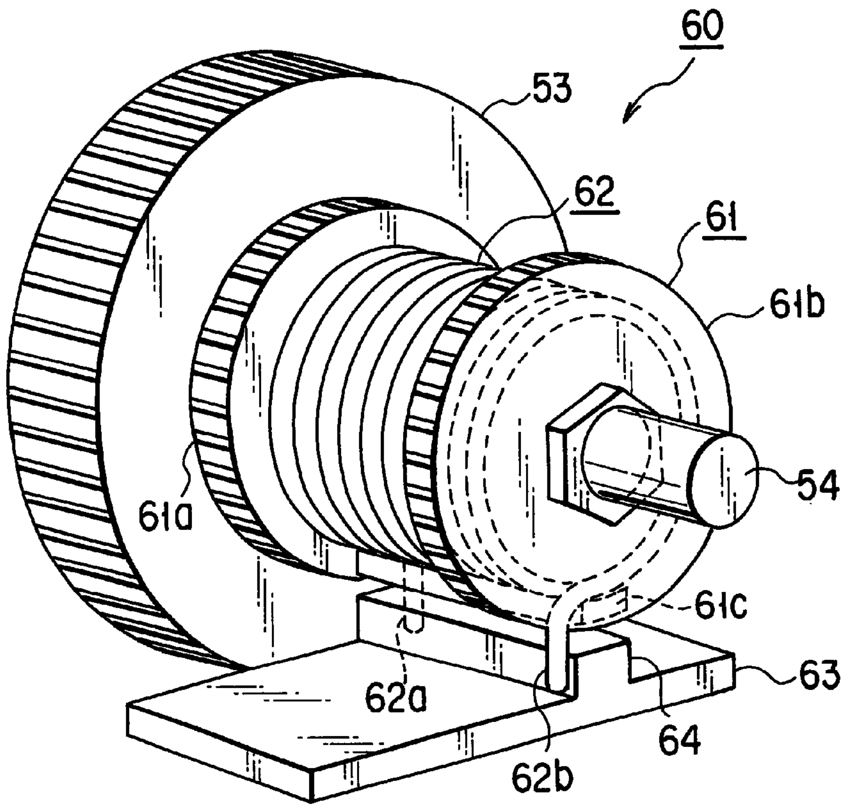
FIG. 6A (PRIOR ART)
FIGS. 6A to 6C are views of the constitution of an automatic bidirectional-returning mechanism of the prior art actuator shown in FIG. 5.
Figure 6B:
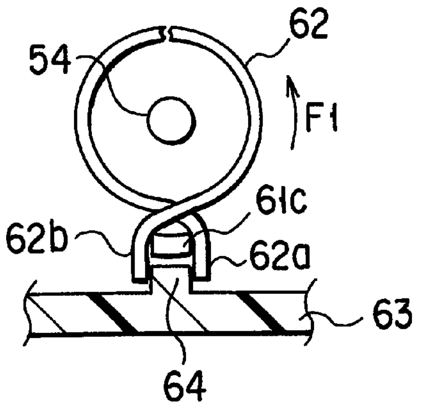
FIG. 6B (PRIOR ART)
Figure 6C:
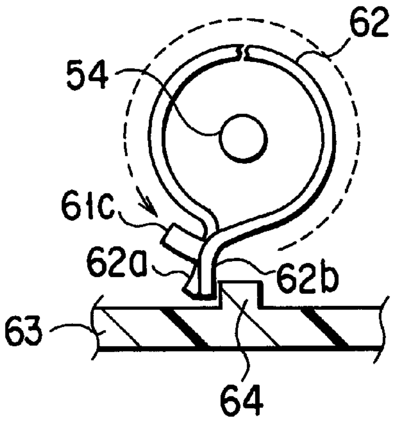
FIG. 6C (PRIOR ART)

A small gear 21 (having, e.g., 18 teeth) is fitted and fixed to the left end portion (in FIG. 1) of the lead screw 16. A large gear 22 (having, e.g., 27 teeth) is engaged with the small gear 21. A rotating shaft 23 is fixed through the large gear 22, and an automatic bidirectional-returning mechanism 60 having the same structure as that shown in FIG. 6 is mounted on the rotating shaft 23.

The mechanism 60 includes a single home-returning coil spring for returning the nut member 17 to the initial position after the output mechanism OP performs a door-locking operation or a door-unlocking operation.

As described above, in the automatic bidirectional-returning mechanism 60, the rotating shaft 23 serving as a main shaft can rotate only one rotation or less (±0.88 rotation) in either the forward or backward direction. This is referred to as a limit rotation angle of the mechanism 60 in the present invention.

In FIGS. 1 and 2, the gears 12, 13, 14 and 15 constitute a first deceleration gear mechanism DM1 for decelerating the rotation of the driving motor 11 and transmitting it to the lead screw 16. Further, the gears 21 and 22 constitute a second deceleration gear mechanism DM2 for decelerating the rotation of the lead screw 16 and transmitting it to the mechanism 60.

[Operation]

An operation of the above actuator for vehicle-door locking mechanism will be described with reference to FIGS. 3A, 3B, 4A and 4B and so on. In FIGS. 3A, 3B, 4A and 4B, a one-dot-one-dash line O indicates a reference position of the actuator.

[Locking Operation]

When the driving motor 11 rotates forward to lock the door of a vehicle, the small gear 12 rotates in the direction of arrow Aa in FIG. 2. The large and small gears 13 and 14 thus rotate in the direction of arrow Bb. Then, the large gear 15, lead screw 16 and small gear 21 rotate in the direction of arrow Cc and accordingly the large gear 22 rotates in the direction of arrow Dd.

Figure 3A:
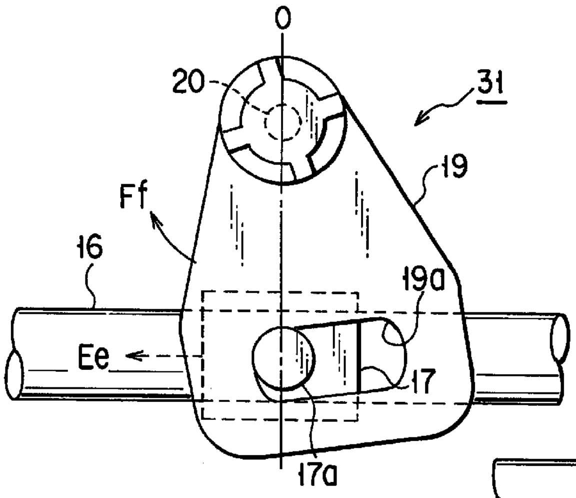
FIGS. 3A and 3B are schematic views each showing one step of an operation of the actuator according to the present invention.
Figure 3B:
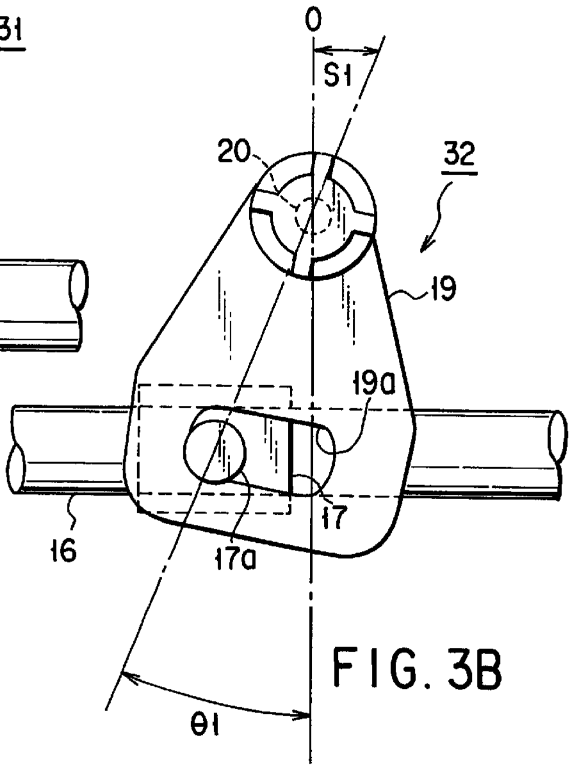

If the lead screw 16 starts rotating in the direction of arrow Cc, the nut member 17 starts moving from the initial state 31, shown in FIG. 3A, in the direction of arrow Ee along the axis of the lead screw 16. When the nut member 17 starts moving, the projection 17*a* of the nut member 17 is pressed on the inner left side of the fitting windows 19*a* of the levers 19. The levers 19 thus turn in the direction of arrow Ff in accordance with the movement of the projection 17*a*. FIG. 3B illustrates a state 32 in which the levers 19 turn only through an angle θ1.

Since the output shaft 20 also turns in response to the turn of the lever 19, the output arm 24 (shown in neither FIG. 3A nor 3B) turns by an angle corresponding to a prescribed stroke S1 (about 15 mm).

The door-locking mechanism is therefore locked.

As the small gear 21 rotates in the direction of arrow Cc, as shown in FIG. 2, in association with the above operation, the large gear 22 rotates in the direction of arrow Dd. For this reason, the automatic bidirectional-returning mechanism 60 carries out the same operation as that shown in FIGS. 6A to 6C (except for the rotating direction), and the home-returning coil spring 62 is compressed. When an engagement end portion 62*b* of the coil spring 62 is brought into contact with one side of a stopper 64 by means of an operation member 61*c*, it cannot rotate any more.

The power of the driving motor 11 is cut off using, e.g., a limit switch immediately before the above state. The driving motor 11 is thus stopped. Then, the decompression force of the compressed coil spring 62 is transmitted to the lead screw 16 through the second deceleration gear mechanism DM2. The decompression force is also transmitted to the driving motor 11 through the first deceleration gear mechanism DM1. The driving motor 11 and lead screw 16 both rotate backward. The nut member 17 thus moves in a direction opposite to that of arrow Ee and returns to the initial position. When the engagement end portion 62*b* of the coil spring 62 returns and contacts the other side of the stopper 64, the above decompression force is lost. The nut member 17 is thus returned to the initial position and stabilized.

Figure 4A:
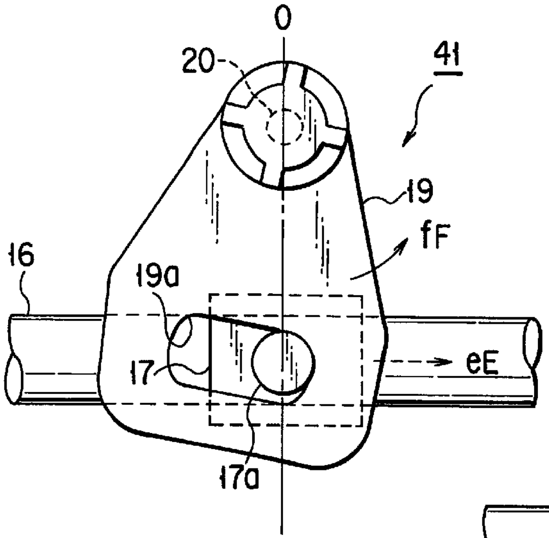
FIGS. 4A and 4B schematic views each showing another step of the operation of the actuator according to the present invention.

The return operation of the nut member 17 is performed within the range of the fitting window 19*a* of the lever 19. Even though the return operation is carried out as described above, the lever 19 remain still in the door-locking position (corresponding to an angle θ1). This is shown in FIG. 4A as a state 41.

In the above state 41, the output mechanism OP is separated from a driving mechanism in view of the relationship between the projection 17*a* of the nut member 17 and the fitting window 19*a* of the lever 19. Therefore, the output mechanism OP is set free and the door-locking mechanism can be operated manually from outside.

[Unlocking Operation]

Figure 4B:
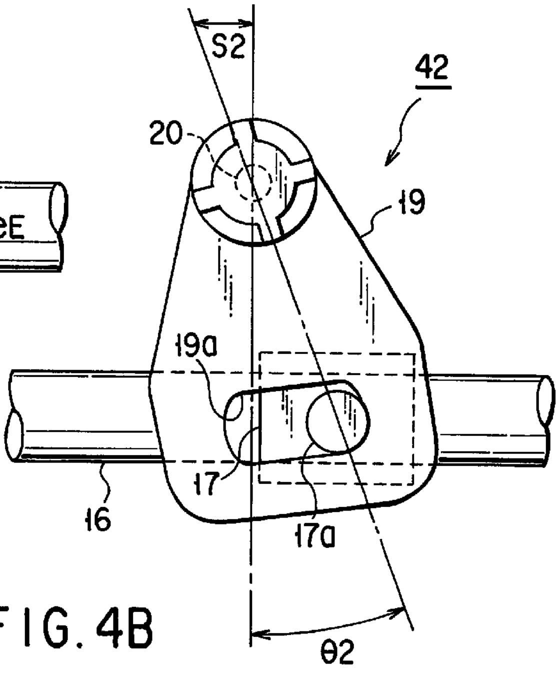
Figure 5:
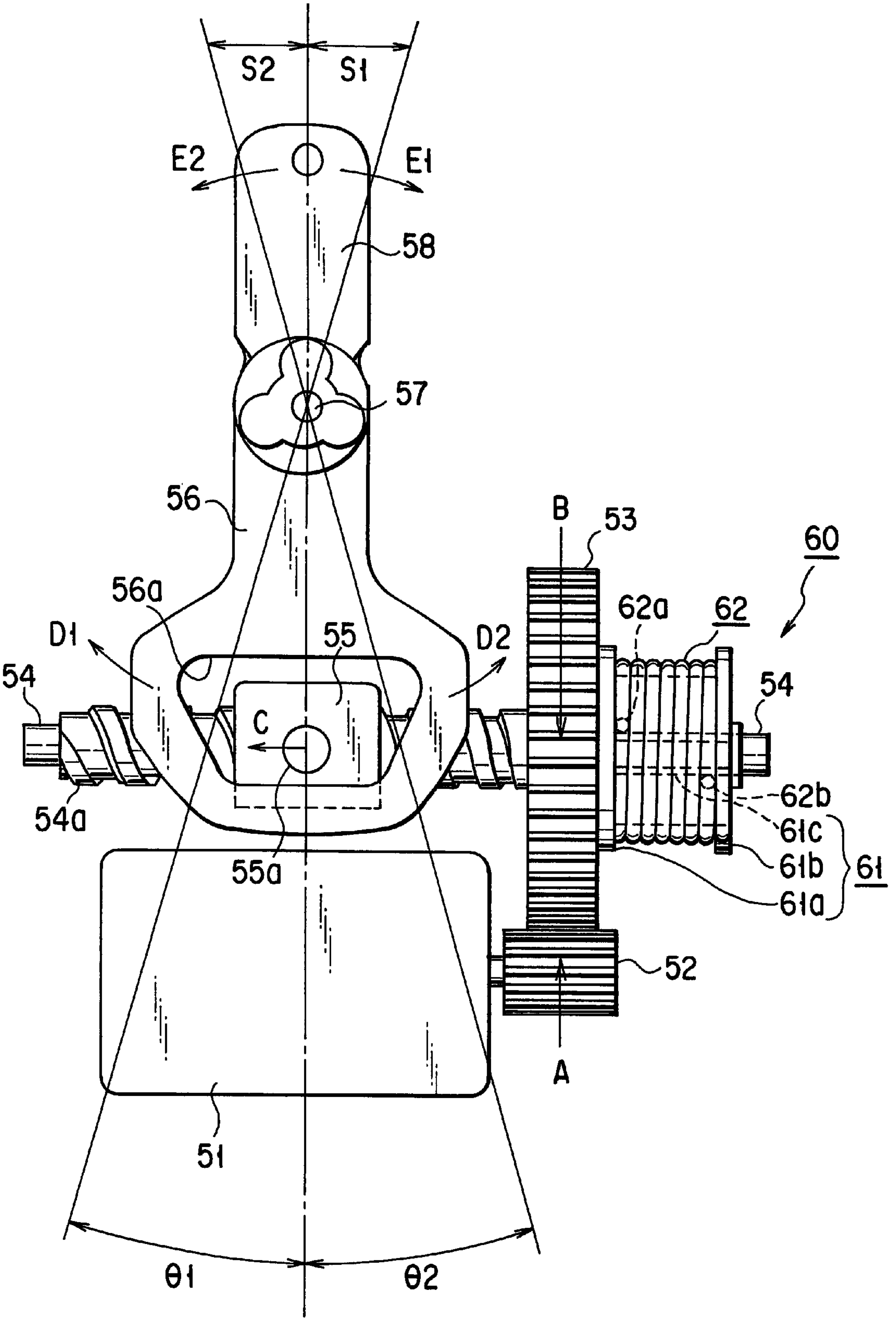
FIG. 5 (PRIOR ART)
FIG. 5 is a plan view of the constitution of a prior art actuator for vehicle-door locking mechanism.

When the driving motor 11 rotates backward to unlock the vehicle door, the first deceleration gear mechanism DM1 and lead screw 16 rotate in a direction opposite to that in the above locking operation. The nut member 17 thus starts moving from the state 41, shown in FIG. 4A, in the direction of arrow eE opposite to that of arrow Ee. If the nut member 17 starts moving, the projection 17*a* of the nut member 17 is pressed on the inner right sides of the fitting window 19*a* of the lever 19. The lever 19 thus turn in the direction of arrow fF opposite to that of arrow Ff by means of the projection 17*a*. FIG. 4B illustrates a state 42 in which the lever 19 turn only through an angle θ1.

Since the output shaft 20 also turns in response to the turn of the lever 19, the output arm 24 (shown in neither FIG. 4A nor 4B) turns by an angle corresponding to a prescribed stroke S2 (about 15 mm). The door-locking mechanism is therefore unlocked.

As the small gear 21 rotates in a direction opposite to that of arrow Cc, as shown in FIG. 2, in association with the above operation, the large gear 22 rotates in a direction opposite to that of arrow Dd. For this reason, the automatic bidirectional-returning mechanism 60 operates in a direction opposite to the above direction to compress the home-returning coil spring 62. When an engagement end portion 62*a* of the coil spring 62 is brought into contact with the other side of the stopper 64 by means of the operation member 61*c*, it cannot rotate any more.

The power of the driving motor 11 is cut off using, e.g., a limit switch immediately before the above state. The driving motor 11 thus stops. Then, the decompression force of the compressed coil spring 62 is transmitted to the lead screw 16 through the second deceleration gear mechanism DM2 and also to the driving motor 11 through the first deceleration gear mechanism DM1. The driving motor 11 and lead screw 16 both rotate backward. The nut member 17 thus moves in the direction of arrow Ee and returns to the initial position. When the engagement end portion 62*a* of the coil spring 62 returns and contacts one side of the stopper 64, the above decompression force is lost. The nut member 17 is thus returned to the initial position and stabilized.

The return operation of the nut member 17 is performed within the range of the fitting window 19*a* of the lever 19 as in the foregoing case. Even though such a return operation is carried out, the lever 19 remain still in the door-locking position (corresponding to an angle θ2). This is shown in FIG. 3A as a state 31.

In the above state 31, the output mechanism OP is separated from the driving mechanism in view of the relationship between the projection 17*a* of the nut member 17 and the fitting window 19*a* of the lever 19. Consequently, the output mechanism OP is set free and the door-locking mechanism can be operated manually from outside.

[Function]

In the above-described embodiment, the automatic bidirectional-returning mechanism 60 having a single home-returning coil spring is mounted on the lead screw 16 serving as a main shaft through the second deceleration gear mechanism constituted of the small gear 21 having 18 teeth and the large gear 22 having 27 teeth. Consequently, the rotating shaft 23 of the mechanism 60 rotates only by the limit rotation angle of not more than one rotation, e.g., 0.88 rotation, as in the prior art case, whereas the lead screw 16 can rotate over a required rotation (1.16 rotation), that is, 1.32 (=0.88×27÷18) rotation. Even though the lead angle of the lead screw 16, i.e., the lead L of the lead screw 16 is relatively small, the stroke of the output arm 24 can be set to larger than a required value (about 15 mm). The inadequacy in force can thus be prevented and a driving torque of, e.g., 2000 Nmm (about 20 kg·cm) can be secured. The axle ratio of the driving motor 11 need not be reduced too much, with the result that both the locking operation time and unlocking operation time can be set to not longer than a prescribed operation time (0.5 second).

The first deceleration gear mechanism DM1 is coupled to one end portion of the lead screw 16, while the second deceleration gear mechanism DM2 is coupled to the other end portion thereof. Thus, the space factor of the actuator holding case is improved and the entire actuator can be formed compact.

(Features of the Embodiment)

[1] An actuator for vehicle-door locking mechanism according to the above embodiment, comprises:

a driving motor (11);

a first deceleration mechanism (DM1) for decelerating a rotation of the driving motor (11);

a lead screw (16) to which the rotation of the driving motor (11) is transmitted through the first deceleration mechanism (DM1);

a nut member (17) fitted on the lead screw (16) and moved in an axial direction of the lead screw (16) in accordance with a rotation of the lead screw (16);

an output mechanism (OP) for causing a door locking mechanism to perform one of a locking operation and an unlocking operation in association with the movement of the nut member (17);

a second deceleration mechanism (DM2) for decelerating a rotation of the lead screw (16); and an automatic bidirectional-returning mechanism (60) to which the rotation of the lead screw (16) is transmitted through the second deceleration mechanism (DM2), the automatic bidirectional-returning mechanism (60) including a single home-returning coil spring (62) for automatically returning the nut member (17) to an initial position after the output mechanism (OP) performs one of the locking operation and the unlocking operation.

[2] In the actuator described in the above item [1], the automatic bidirectional-returning mechanism (60) includes:

a stopper (64) provided on a mounting base (63) and constituted of a projection having both sides which are parallel with each other;

a single home-returning coil spring (62) having engagement end portions (62*a*, 62*b*) on both sides, for bringing the engagement end portions (62*a*, 62*b*) into contact with both sides of the stopper (64) at a given pressure; and a biasing member (61*c*) to which the rotation of the lead screw (16) is transmitted through the second deceleration mechanism (DM2), the biasing member (61*c*) biasing one engagement end portion (62*a*) of the home-returning coil spring (62) in a circumferential direction of the coil spring (62) from one side of the stopper (64) when the nut member (17) moves in one direction from the initial position, and biasing another engagement end portion (62*b* ) of the home returning coil spring (62) in the circumferential direction of the coil spring (62) from other side of the stopper (64) when the nut member (17) moves in another direction from the initial position.

[3] In the actuator described in the above item [1], the output mechanism (OP) is rotatably provided and constituted of both a lever (19) having a fitting portion (19*a*), which is fitted to part (17*a*) of the nut member (17), at a rotating end portion, and an output arm (24) for causing the door locking mechanism to perform one of the locking operation and the unlocking operation in accordance with a rotation of the lever (19); and the fitting portion (19*a*) is a fitting window (19*a*) shaped to such a size that the nut member (17) is allowed to move within one of a range from the initial position to a locking-operation position and a range from the initial position to an unlocking-operation position.

[4] In the actuator described in the above item [1], the second deceleration mechanism (DM2) has a deceleration ratio which is set to a value corresponding to a limit rotation angle of the automatic bidirectional-returning mechanism (60) when the lead screw (16) rotates one or more rotation.

[5] In the actuator described in the above item [1], the first deceleration mechanism (DM1) is a gear mechanism coupled to one end portion of the lead screw (16), and the second deceleration mechanism (DM2) is a gear mechanism coupled to another end portion of the lead screw (16).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An actuator for vehicle-door locking mechanism comprising:

a driving motor;

a first deceleration mechanism for decelerating a rotation of the driving motor;

a lead screw to which the rotation of the driving motor is transmitted through the first deceleration mechanism;

a nut member fitted on the lead screw and moved in an axial direction of the lead screw in accordance with a rotation of the lead screw;

an output mechanism for causing a door locking mechanism to perform one of a locking operation and an unlocking operation in association with the movement of the nut member;

a second deceleration mechanism for decelerating a rotation of the lead screw; and an automated bidirectional-ring mechanism to which the rotation of the lead screw is transmitted through the second deceleration mechanism, the automatic bidirectonal-returning mechanism automatically returning the nut member to an initial position after the output mechanism performs one of the locking operation and the unlocking operation, and the automatic bidirectional-returning mechanism including:

a projection having a stopper function, provided on a mounting base and having both sides which are parallel with each other;

a single home-returning coil spring having engagement end portions on both sides, for bringing the engagement end portions into contact with both sides of the projection at a given pressure; and a biasing member to which the rotation of the lead screw is transmitted through the second deceleration mechanism, the biasing member biasing one engagement end portion of the home-returning coil spring in a circumferential direction of the coil spring from one side of the projection when the nut member moves in one direction from the initial position, and biasing another engagement end portion of the home returning coil spring in the circumferential direction of the coil spring from other side of the projection when the nut member moves in another direction from the initial position.

2. An actuator according to claim 1, wherein the output mechanism is rotatably provided and includes both a lever having a fitting portion, which is fitted to part of the nut member, at a rotating end portion and an output arm for causing the door locking mechanism to perform one of the locking operation and the unlocking operation in accordance with a rotation of the lever; and the fitting portion is a fitting window shaped to such a size that the nut member is allowed to move within one of a range from the initial position to a locking-operation position and a range from the initial position to an unlocking-operation position.

3. An actuator according to claim 1, wherein the second deceleration mechanism has a deceleration ratio which is set such that the automatic bidirectional-returning mechanism rotates to a rotation angle at which the automatic bidirectional-returning mechanism is allowed to rotate in one of forward and backward directions when the lead screw rotates at least one rotation.

4. An actuator according to claim 1, wherein the first deceleration mechanism is a gear mechanism coupled to one end portion of the lead screw, and the second deceleration mechanism is a gear mechanism coupled to another end portion of the lead screw.

* * * * *